(No Model.) 8 Sheets—Sheet 1.

F. W. COOLBAUGH & I. G. HOOPER.
RAILWAY TIME SIGNAL.

No. 440,890. Patented Nov. 18, 1890.

Fig. 1

WITNESSES:

INVENTORS:
Frank W. Coolbaugh
and
Irvin G. Hooper.
BY Fredc. C. Fraentzel, ATTY.

(No Model.) 8 Sheets—Sheet 3.

F. W. COOLBAUGH & I. G. HOOPER.
RAILWAY TIME SIGNAL.

No. 440,890. Patented Nov. 18, 1890.

WITNESSES:

INVENTORS:
Frank W. Coolbaugh
and
Irvin G. Hooper,
BY Fredk C. Fraentzel, ATTY.

(No Model.) 8 Sheets—Sheet 4.

F. W. COOLBAUGH & I. G. HOOPER.
RAILWAY TIME SIGNAL.

No. 440,890. Patented Nov. 18, 1890.

WITNESSES: INVENTORS:
Frank W. Coolbaugh
and
Irvin G. Hooper,
BY Fredk C. Fraentzel, ATTY.

(No Model.) 8 Sheets—Sheet 6.

F. W. COOLBAUGH & I. G. HOOPER.
RAILWAY TIME SIGNAL.

No. 440,890. Patented Nov. 18, 1890.

Fig. 8

WITNESSES:
Wm E. Blum Jr
Fred'k S. Rice.

INVENTORS:
Frank W. Coolbaugh
and
Irvin G. Hooper,
BY Fred'k C. Fraentzel, ATTY.

(No Model.) 8 Sheets—Sheet 7.

F. W. COOLBAUGH & I. G. HOOPER.
RAILWAY TIME SIGNAL.

No. 440,890. Patented Nov. 18, 1890.

WITNESSES:

INVENTORS:
Frank W. Coolbaugh
and
Irvin G. Hooper,
BY Fred'k C. Fraentzel, ATTY.

(No Model.) 8 Sheets—Sheet 8.

F. W. COOLBAUGH & I. G. HOOPER.
RAILWAY TIME SIGNAL.

No. 440,890. Patented Nov. 18, 1890.

WITNESSES: INVENTORS:
Frank W. Coolbaugh
and
Irvin G. Hooper,
BY Fred'k C. Fraentzel ATTY.

UNITED STATES PATENT OFFICE.

FRANK W. COOLBAUGH, OF EAST ORANGE, AND IRVIN G. HOOPER, OF NEWARK, NEW JERSEY, ASSIGNORS TO GEORGE J. MAGEE AND AUSTIN LATHROP, BOTH OF CORNING, NEW YORK.

RAILWAY TIME-SIGNAL.

SPECIFICATION forming part of Letters Patent No. 440,890, dated November 18, 1890.

Application filed September 17, 1889. Serial No. 324,228. (No model.)

*To all whom it may concern:*

Be it known that we, FRANK W. COOLBAUGH and IRVIN G. HOOPER, citizens of the United States, residing at East Orange and Newark, respectively, in the county of Essex and State of New Jersey, have invented certain new and useful Improvements in Automatic Railway-Signals; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in automatic railway time-signals; and the purpose of the invention is to construct an instrument provided with a time-piece by which an engineer may readily read the number of minutes which have elapsed since the passage of the last preceding train at the particular point where the signaling-instrument is erected.

This invention has reference to that class of railway time-signals which are provided with an ordinary eight-day clock fixed upon a post erected at any convenient point at the side of the road-bed and at such a height where the signal may be readily read by the engineer in his cab, and the clock mechanism of which is connected with a system of levers or similar means extending under the tracks, by means of which said levers are operated during the passage of a train or engine over that point, thereby causing the minute-hand on the dial to be released and thrown back to its normal position on the dial.

A further object has been to arrange this mechanism operating the system of levers within the post within a hollow cross-tie or sleeper arranged in the road-bed in the manner herein shown and described, whereby the various defects due to the raising and settling of the ties in the winter when the frost is in the ground are successfully overcome.

The several features of the invention and the various advantages resulting therefrom will be fully set forth in the following description.

In the accompanying sheets of drawings, in which similar reference-letters are employed to indicate corresponding parts in each of the several views.

Figure 7:
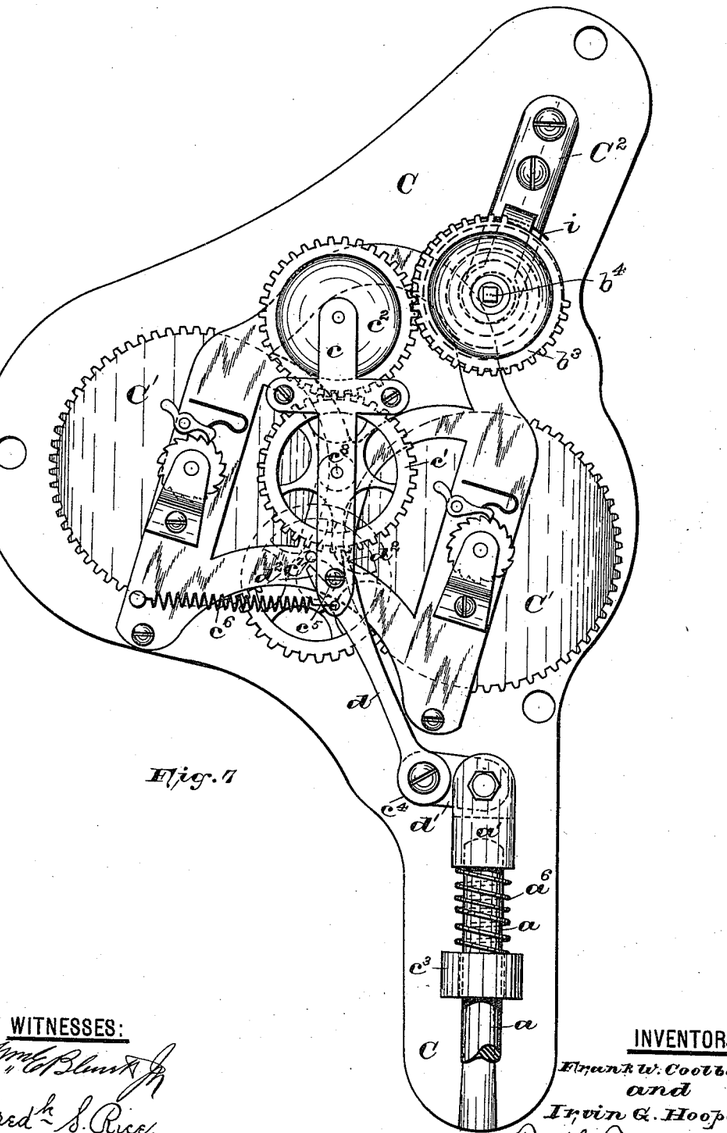
Figs. 7 and 8 are enlarged views of the clock mechanism, showing the clock-gearing in its locked and unlocked engagement, with a mutilated gear operating the minute-hand, the front of the inclosing-casing being removed.
Figure 8:
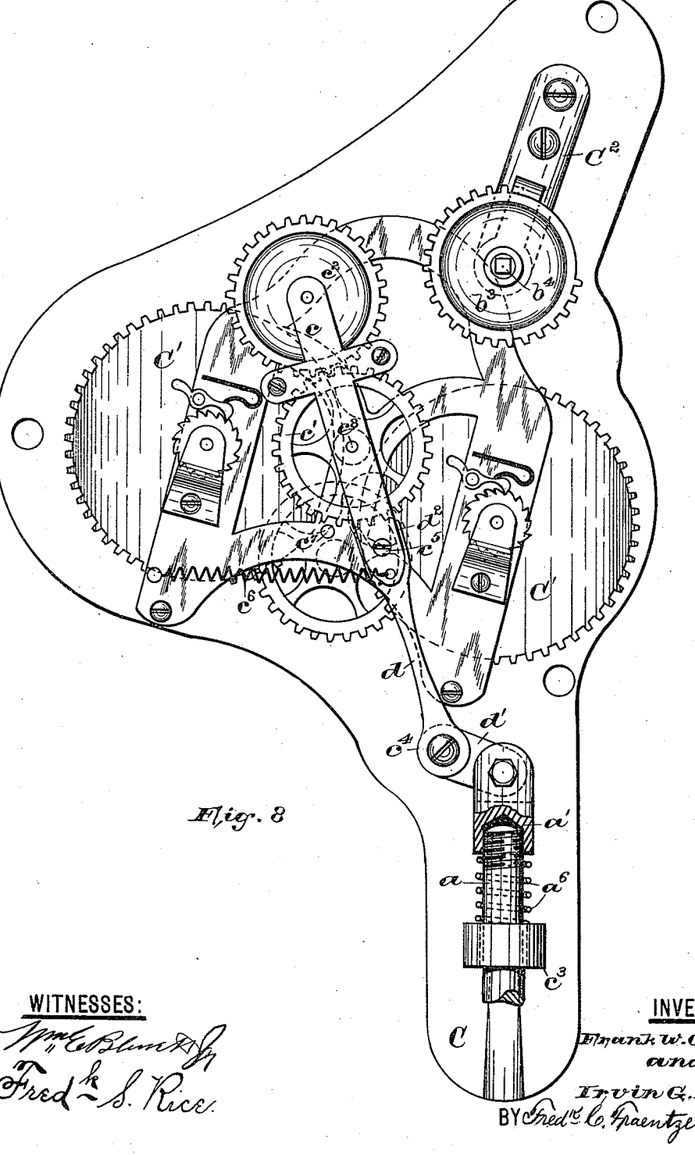
Figures 9, 10:
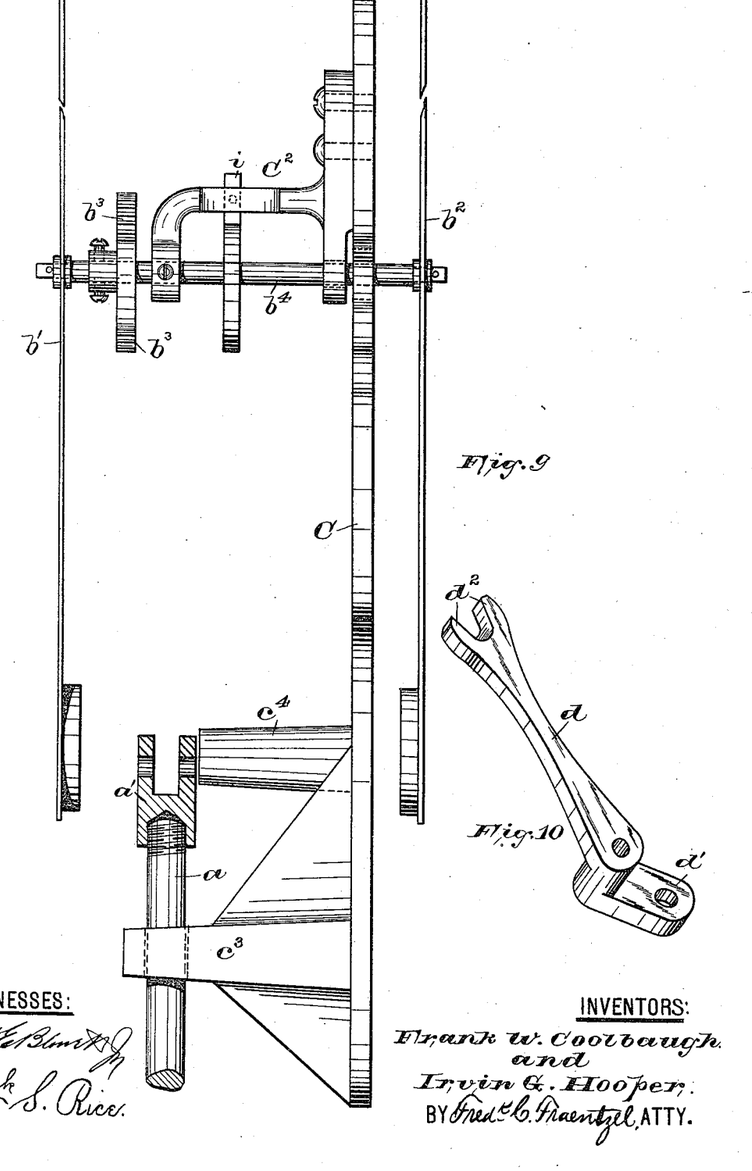
Fig. 9 is a side elevation of a plate provided with a bracket to which the shaft carrying the index-hands and the mutilated gear are secured; also, a standard on said plate provided with a hole through which the releasing lever or rod in the clock-carrying post reciprocates.
Fig. 10 is a perspective view of a crank arm or lever intended to be pivotally attached to the releasing-rod and the oscillating gear-carrying frame shown in Figs. 7 and 8, by means of which said frame is operated during the passage of a train.

By the side of the railroad-track at a point clearly visible to the engineer in his cab is erected a hollow post A. Upon the upper portion of the post A is arranged a flange A′, supporting the clock-casing B, provided on both sides thereof with dial-faces $b$ $b$ and minute-hands $b′$ and $b^2$, as indicated more especially in Fig. 9. The casing B has arranged therein on a suitable back plate C an eight-day-clock mechanism C′ of any well-known construction, which is provided with an oscillating frame $c$, on which are arranged the gears $c′$ and $c^2$, meshing with each other. The gear $c′$, as will be understood, is driven by the pinion of the clock mechanism C′, thereby driving the gear $c^2$, which in turn operates the mutilated gear $b^3$, secured to the index-hand-carrying shaft $b$, as shown in Figs. 7, 8, and 9. On the lower end of the plate C, cast integrally thereon, is a standard $c^3$, provided with a perforation, through which extends the reciprocating releasing lever or rod $a$, as illustrated. Said lever $a$ is threaded on the upper end projecting into the frame B and is screwed into a fork $a′$, to which is pivotally secured by means of a pin the end $d′$ of a crank-lever $d$, which is pivoted to the post $c^4$, Fig. 9, cast on the back plate C. The free end of the lever $d$ is provided with prongs or arms $d^2$, which extend on both sides of and embrace a pin $c^5$ in the oscillating frame $c$, as shown in Fig. 7, and which acts to throw the gear $c^2$ out of engagement with the mutilated gear $b^3$ when the releasing-rod $a$ is pulled down, as illustrated in Fig. 8.

To facilitate the return of the oscillating frame to its normal position (indicated in Figs. 3 and 7) and to cause the gear $c^2$ to mesh with the mutilated gear $b^3$ when the rod $a$ and the crank-lever $d$ have been released, a spiral spring $c^6$ may be employed, which is secured to the clock-frame and to the lower end of the oscillating frame. A stop $c^7$ may be arranged on the clock-mechanism frame to prevent the gears $c^2$ and $b^3$ from becoming jammed.

Figures 3, 4:
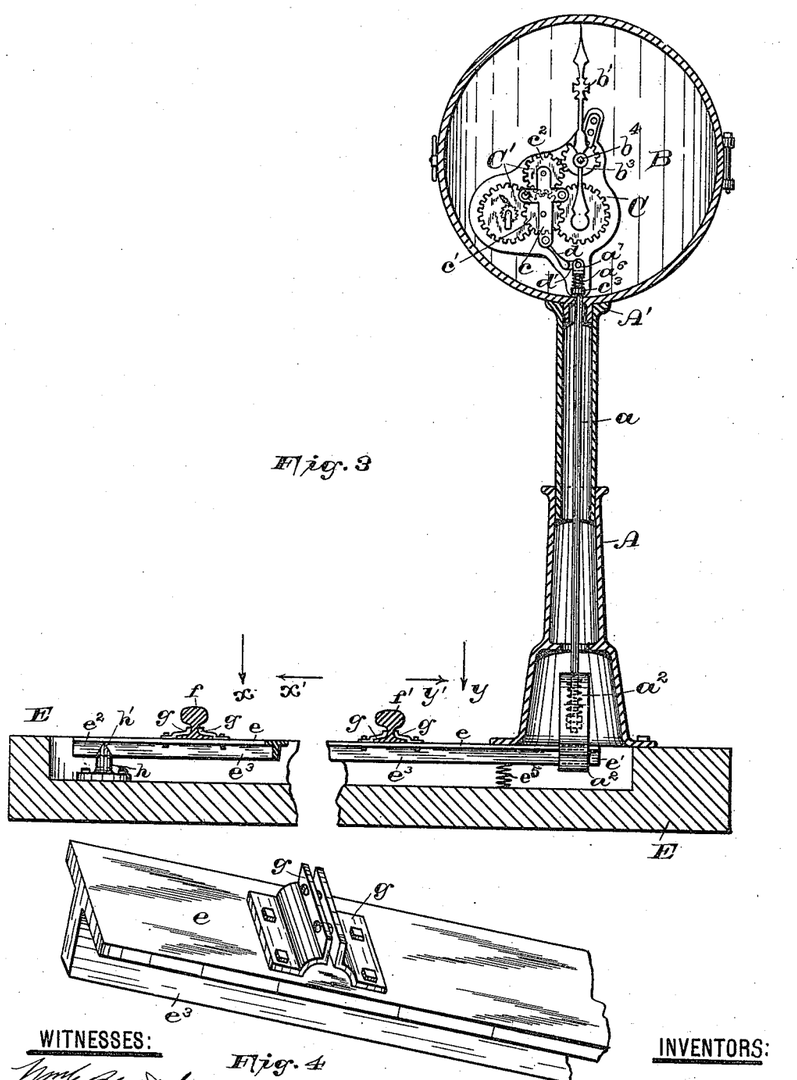
Fig. 3 represents a longitudinal section through the hollow cross-tie and the clock-carrying post.
Fig. 4 is a detail perspective view of a part of the T-rail provided with means thereon for attaching the same to the under side of the rails.
Figure 12:
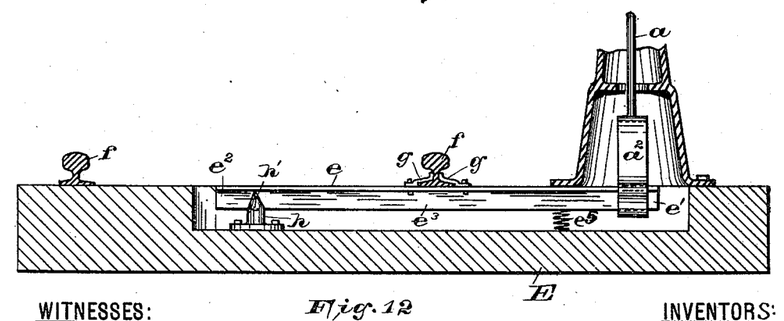
Fig. 12 is a cross-section thereof.

The clock-carrying post A is secured by suitable means on a hollow cross-tie E, within which is arranged a T rail or bar $e$, secured to the under side of the rails $f$ and $f′$ by suitable means, such as clamping-plate $g$, bolted to the sides of the rails and to the top of the T-rail, as in Fig. 4, or in any other convenient manner. One end, as $e′$, of the T-rail is hung in a saddle $a^2$, through the top of which passes the lower end of the reciprocating rod $a$, which is provided with two set-nuts $a^3$ and $a^4$ thereon and a spiral spring $a^5$, the purpose of which will be more fully described hereinafter. The other end $e^2$ of the T rail or bar $e$ is placed within a slotted fulcrumal post $h$, secured within the hollow cross-tie by means of bolts and provided with pointed arms $h′$, extending up on both sides of the portion $e^3$ of the T rail or bar on which said T-rail rides, the knife-edge of said arms $h′$ acting as a fulcrumal bearing for said rail and allowing the same to be forced down when the rails $f$ and $f′$ are deflected during the passage of a train over the same and causing the rod $a$ in the post likewise to be pulled down, thereby throwing the gear $c^2$ out of mesh with the mutilated gear $b^3$ by the action of the intermediately-arranged mechanism on the oscillating frame $c$. A spring $e^5$ may be arranged under the T-rail, as shown in Figs. 3 and 12, to cause the return of said rail to its normal position when the train has passed over the rails $f$ and $f′$ above the same.

The principle of the apparatus is as follows: The faces, which are arranged on opposite sides of the clock-casing, are provided on their surfaces with the numerals or characters "0," "5," "10," "15," "20," and "25." When in its normal position, the index or minute hand is at "0;" but as soon as the clock has been wound its mechanism is set in operation and the hands on the faces of the clock begin to move, the gear $c′$, operated by the clock mechanism, meshing with the gear $c^2$, which causes the rotation of the mutilated gear $b^3$ and the index-hands $b′$ and $b^2$. These hands will consequently keep on moving until the segmental portion of the gear $b^3$ reaches the teeth on the gear $c^2$, thereby being thrown out of engagement, and at which instant the index-hands will have reached the numeral "25" on the faces of the clock, and thus stop automatically at this point.

Figure 1:
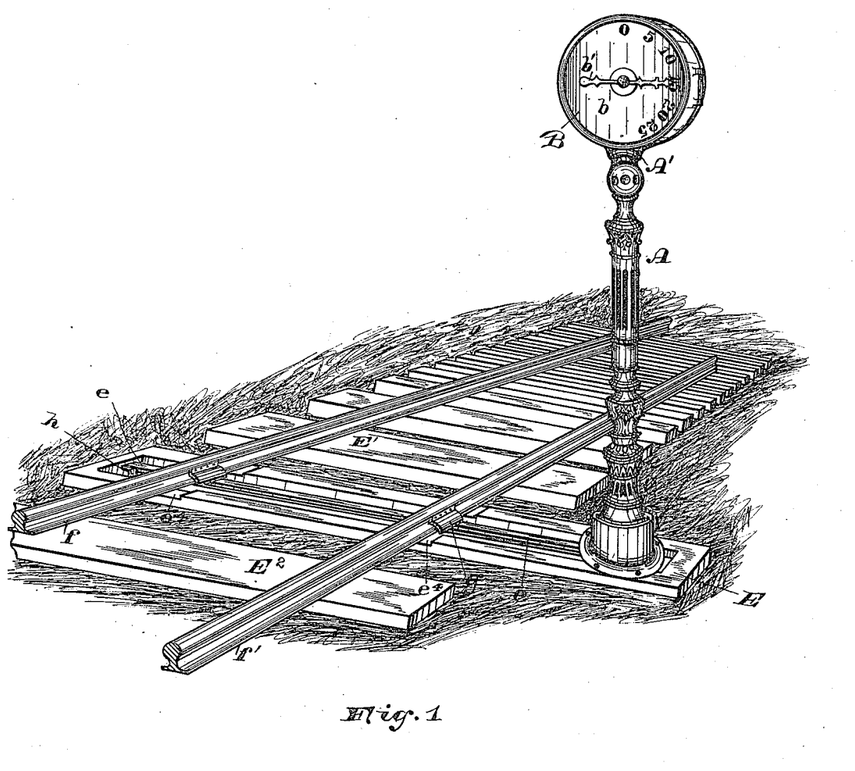
Figure 1 is a perspective view of our time-signal arranged at the side of the road-bed, illustrating the minute-hand on the face of the clock and indicating to the engineer that fifteen minutes have elapsed since the passage of the last preceding train at this point.

To better understand the operation of the apparatus, suppose the index-hand has moved on to the numeral "15" on the dial, as shown in Fig. 1, which indicates that the last train passed this point fifteen minutes previously. A second train reaching the signal-post at this time, the engineer at once knows that the first train has sufficient headway to allow his train to pass on into the next section. As soon as the wheels of the locomotive and cars pass over the rails $f$ and $f′$ at the points above the cross-tie E said rails are caused by the weight of the train to become slightly deflected, and the tie and the T-rail $e$ are forced downwardly, thus causing said T-rail to turn on its pivotal post $h$, and thereby pulling down the rod $a$ in the post A, as is evident from the drawings. The T-rail, as has been stated, rests in a saddle or yoke $a^2$, secured to the rod $a$. On the upper end of said rod, between the standard $c^3$ and the fork $a′$, is arranged a second spiral spring $a^6$, encircling the rod $a$, for the purpose of taking up any undue strain on the rod and thereby preventing the oscillating frame and its gearing from being thrown over too suddenly and the inoperativeness of the clock mechanism. It will readily be seen that another great advantage is attained in arranging the other spring $a^5$ between the nuts on the lower end of the rod $a$ and the upper end of the saddle $a^2$, as thereby any extra strain on said rod, due to a very great weight of the train, is taken up by this spring when the upper spring $a^6$ has been depressed to its maximum limit. When the rod $a$ has been pulled down, the crank-lever $d$ is caused to rotate from its normal position shown in Fig. 7 to that shown in Fig. 8, the oscillating frame $c$ thereby turning about its pivotal pin $c^8$, throwing the gears $c^2$ and $b^3$ out of mesh, and whatever position the index-hands may have been in at that time they are immediately pulled back to the mark "0" on the dial by means of a spiral spring $i$, secured to the index-hand shaft $b^4$ and post $c^2$, as is illustrated more especially in Figs. 7 and 9.

Figure 2:
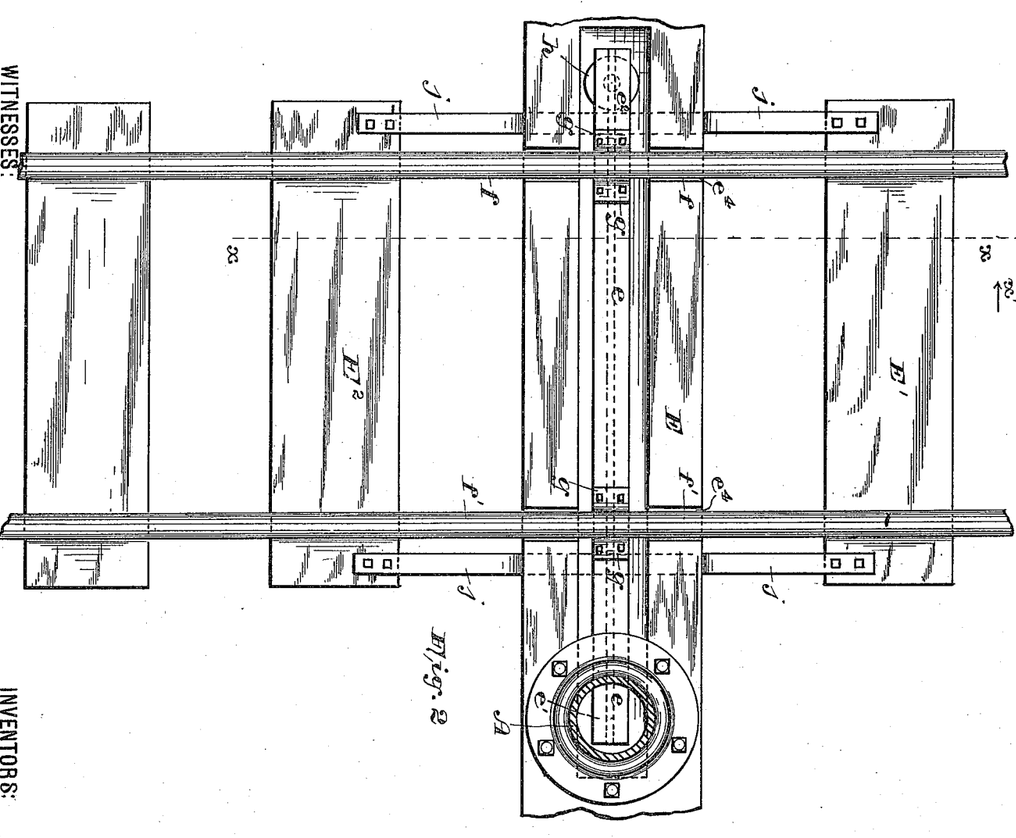
Fig. 2 is a plan view of the arrangement of the ties or sleepers in the road-bed and the arrangement of a T lever or rail arranged in the hollow cross-tie for operating the clock-releasing mechanism within the post.
Figure 6:
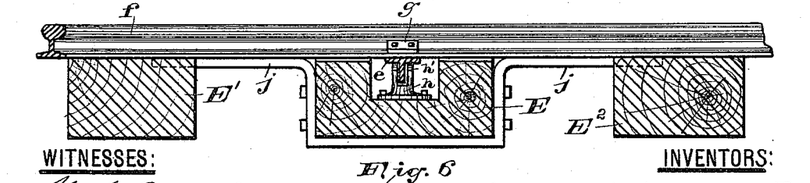
Fig. 6 represents a cross-section taken through lines *x*, looking in the direction of arrow *x'* in Figs 2 and 3.

In order to avoid any undue settling of the hollow cross-tie E below the level of the grade of the adjacent cross-ties E' and E², said ties have been provided on the outer sides of the rails $f'$ and $f^2$ with wrought-iron straps $j$, which are firmly secured to the tops of the ties E' and E² and extend and pass below the hollow tie E, as shown in Figs. 2 and 6. These straps are secured to the ties in any well-known manner by bolts or ordinary spikes.

As will be understood, the hollow tie E, which is arranged in the road-bed in the manner just described, is not firmly embedded in the ballast of the road-bed. This arrangement has the advantage that when the train is passing over the hollow cross-tie the same is depressed, and with it the mechanism arranged therein, and also the mechanism in the post A, and the signal is operated. Furthermore, by securing the three ties together the ties E' and E², which are firmly embedded in the ballast, will raise and lower with the changes in the ground when the frost is therein in the winter, and with the same the hollow tie E will be raised and lowered without disturbing the level of the rails in the road-bed.

Figure 5:
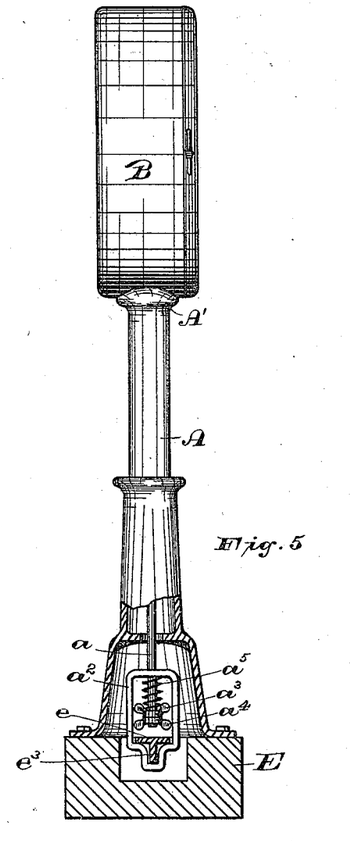
Fig. 5 is an end elevation of the post and clock, showing the lower part of the post and the hollow tie on which the same is arranged in section and illustrating the manner of securing the T-rail within the post in a saddle attached to the clock-releasing lever or rod within the post. The section of the tie and its inclosed T-rail is taken through *y*, looking in the direction of the arrow *y'* in Fig. 3.
Figure 11:
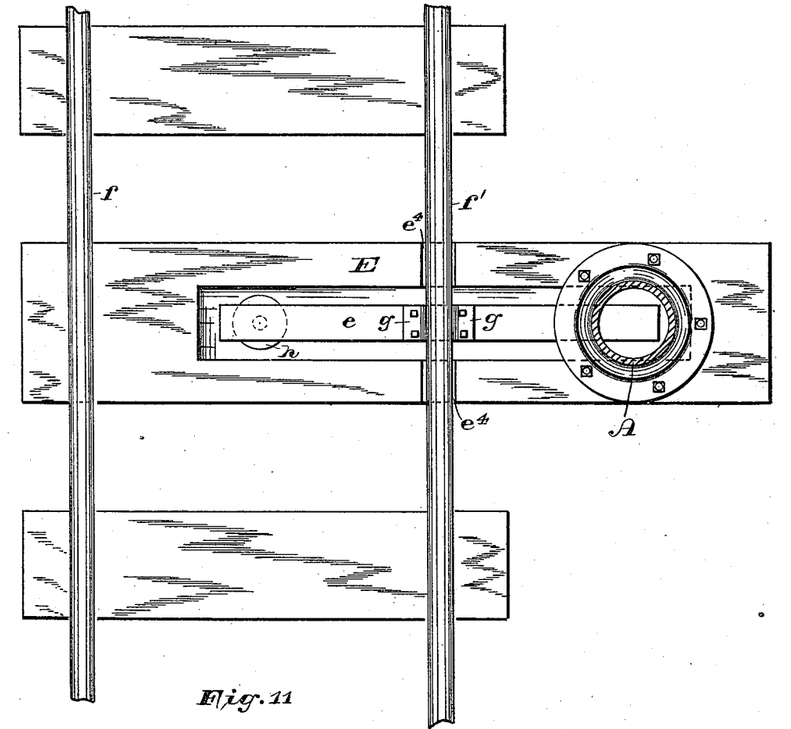
Fig. 11 illustrates a different arrangement of the T-rail within the hollow cross-tie.

The cross-tie E may be provided when necessary with cut-away portions $e^4$ to allow the rails $f$ and $f'$ to be depressed down into the same, and thereby insuring the prompt action of the T rail or bar in the hollow tie upon the reciprocating rod in the post A and by its intermediately-arranged mechanism upon the clock. As will be seen from Fig. 5, the spring $a^5$ is arranged on the thumb-nuts $a^3$ and $a^4$, by means of which the saddle $a^2$ may be desirably raised or lowered to correctly balance the T-rail $e$ therein and on its fulcrumal post $h$. Instead of arranging the T-rail beneath both of the tracks and its fulcrumal post on the outside of the tracks, as shown in Figs. 1 and 2, &c., said post $h$ may be arranged between the tracks, as in Figs. 11 and 12, and the tie hollowed out accordingly. The operation of the device is the same as that illustrated in the other figures already described.

Instead of pivoting the T-rod $e$, which is secured to the rails $f$ and $f'$, as described, on the knife-edges of the post $h$, as illustrated in Fig. 2, said post may be entirely dispensed with and the rail supported by and secured to the under sides of the rails $f$ and $f'$, the operation of said T-rail upon the signal-post mechanism being performed in the same manner as has been described. In lieu of the spring $i$ for causing the return of the index-hands to the zero-point when the train has passed over the rails above the hollow tie, the said index-hands may be weighted at one end, as in Fig. 9, which serves to return the index-hands to their normal positions.

To prevent dirt and snow and ice from filling up the hollow tie and causing the inoperativeness of the mechanism therein, said tie may be provided with a covering of wood or sheet metal, as will be understood.

The great advantage of this device is its simplicity of construction and in that its parts are not liable to get out of order, as the same are not exposed.

When the clock mechanism has been wound, the signal is automatic, first, in the rotation of the index-hand, thereby indicating the time elapsed since the passage of the preceding train at the signal-station, and, secondly, in that the hands of the clock are caused to return to their starting-points, being automatically operated to return to their normal position by the approach of the wheels of the locomotive, &c. Furthermore, as the signal is truly automatic and operates independently of human agency, there is no danger of forgetting to set the signal by the track-hands, as is sometimes the case, due to the inability or forgetfulness of such persons when the signal devices are not automatic in their action.

A further advantage is that on reaching the signal-station, as soon as the wheels of the forward truck of the locomotive have passed over the hollow tie, the hands on the dial fly back to their normal positions, and the engineer knows that the mechanism is in good working order and that his train is protected.

This signal is especially adapted on roads where trains are run with little headway.

By providing the clock with index-hands and faces on both sides of the case B the signaling apparatus is as well adapted for single-track railroads as well as on double-track roads.

Having thus described our invention, what we claim is—

1. In an automatic railway time-signal, as an improvement, an oscillating frame provided with a set of gears meshing with one another, a mutilated gear meshing with one of said gears on the oscillating frame, a shaft on which said mutilated gear is arranged, said shaft being provided with index-hands and a spring encircling the shaft, a forked crank-lever engaging with the lower end of the oscillating frame, and a spring-actuated releasing-rod to which said crank-lever is pivotally secured, as and for the purpose set forth.

2. In an automatic railway time-signal, as an improvement, the herein-described oscillating frame $c$, substantially as shown, having gears $c'$ and $c^2$ thereon meshing with each other, a pivotal pin $c^8$, and a mutilated gear meshing with said gear $c^2$, arranged on an index-hand-carrying shaft provided with an encircling spring, in combination with a clock mechanism and the frame thereof, a pin $c^7$ on said frame, and a spring $c^6$, secured to the clock-mechanism frame and the gear-carrying frame, a forked crank-lever engaging with the lower end of the oscillating frame, and a spring-actuated rod to which said lever is secured, as and for the purpose set forth.

3. The combination of a pivoted rail arranged within a hollow cross-tie, a hollow post on said tie, a clock on said post provided with index-hands, and connecting means consisting, essentially, of a releasing-rod attached to said pivoted rail at one end and provided at the other end with a crank-lever having a forked arm adapted to engage with an oscillating frame carrying the clock mechanism to throw the same out of gear with the index-hand-carrying shaft, and thereby causing the return of said hands to their normal positions when a train has passed above the rail within the hollow cross-tie, as and for the purpose set forth.

4. In an automatic railway time-signal, the combination, with the rails, of a hollow cross-tie provided with a T-rail pivotally secured therein and extending and secured beneath said rails, said T-rail being connected at one end with a spring-actuated releasing-rod arranged in a signaling apparatus, said releasing-rod having a forked crank-lever adapted to engage with the lower end of an oscillating frame provided with a set of gears meshing with each other, a mutilated gear meshing with one of said gears on the oscillating frame, and a shaft on which said mutilated gear is arranged, provided with a spring encircling said shaft, whereby when the T-rail in the hollow tie causes the releasing-lever to be pulled down the crank-lever throws the gears on the oscillating frame out of engagement with the mutilated gear and causes the return of the index-hand-carrying shaft, as set forth.

5. In an automatic railway time-signal, the combination, with the rails, of a T rail or rod secured to the under side of the rails and pivoted at one end within a hollow tie arranged in the road-bed, and upon which tie said rails are loosely arranged, said T-rail thereby being adapted to receive motion from passing car-wheels, a clock-mechanism releasing-rod having a saddle thereon in which the opposite and free end of said T-rail is hung, and means on said rod arranged within the said saddle whereby said T-rail may be adjusted to receive a long or short up-and-down motion during the passage of the car-wheels, and a forked crank-lever on the upper end of said releasing-rod adapted to engage with the lower end of an oscillating frame, as and for the purposes set forth.

6. In combination with a signal-indicator and its operating mechanism, said indicator being arranged at one end of a hollow tie, the releasing-rod $a$, the saddle $a^2$, and a T-rail hung in said saddle and pivotally arranged in said hollow tie and secured to the rails of the road-bed, a forked crank-lever adapted to engage with an oscillating frame $c$ when the releasing-rod has been pulled down, said oscillating frame having gears thereon which mesh with a gear on the index-hand-carrying shaft, substantially as and for the purposes set forth.

7. The combination, with the clock mechanism, of an oscillating frame $c$, provided with gears $c'$ and $c^2$, a pin or post $c^5$, on said frame, a crank-lever provided with arms extending on each side of said post $c^5$ and connected with the releasing-rod $a$, as set forth, all of said parts being arranged on a frame or base-plate provided with a bracket thereon through which said rod $a$ passes, a fork $a'$ on the end of the rod $a$ and a spiral spring around said rod between said fork $a'$ and the bracket, a saddle on the opposite end of the rod $a$, through the top of which said rod extends, a spring $a^5$ and set screws or nuts thereon, and a rod or rail arranged in a hollow cross-tie and connected with the rails in the road-bed, whereby a downward motion is communicated to the releasing-rod during the passage of a train, substantially as set forth.

8. The combination of a pivoted oscillating frame $c$ and the crank-lever $d$, pivotally secured to a post $c^4$ and attached to a fork $a'$, a rod $a$, secured to said fork, and a T-rail arranged on the lower end of said rod $a$ and pivoted at the opposite end in a fulcrumal post, said T-rail being secured to the rails, substantially as set forth.

9. The combination, with the clock mechanism and its index-hand, its shaft and gear, and gear-carrying oscillating frame, of a crank-lever provided with arms $a^2$ thereon, adapted to engage with said oscillating frame, a spring-actuated reciprocating releasing-rod arranged within a hollow post and connected at its upper end with the said crank-lever, springs $a^5$ and $a^6$ on said rod, arranged as set forth, and a T-rail secured to said rod and the railway-tracks and pivotally arranged within a hollow tie and under said track, for the purposes set forth.

10. In an automatic railway time-signal, the combination, with the rails of the road-bed, of a hollow cross-tie arranged beneath said rails, a rail or bar in the hollow part of said tie and secured to the rails and engaging with a rod arranged within a hollow post erected on one end of the tie, a clock mechanism on said post provided with an oscillating frame having a set of gears meshing with each other, a mutilated gear meshing with one of said gears on the oscillating frame, a shaft on which said mutilated gear is arranged, said shaft being provided with index-hands and a spring encircling the same, and a forked crank-lever pivotally attached to the upper end of said rod, adapted to engage with the lower end of said oscillating frame, substantially as and for the purposes set forth.

11. In a railway time-signal, the combination of an index-hand provided with a spring for returning said hand to its normal position, a shaft to which said hand is secured, a mutilated gear on said shaft, a standard $C^2$ on a plate C, for securing said shaft within the clock-frame, a spring-actuated oscillating frame carrying a set of gears, as set forth, and the herein-described connection for communicating motion to the oscillating frame, consisting, essentially, of an adjustable rod $a$, provided at its lower end with a coiled tension-spring, set-nuts on said rod for varying the tension of said spring, and a lever connected with said end of the rod and the rails in the road-bed, the upper end of said rod $a$ being secured to a fork $a'$, a crank-lever pivotally secured to said plate C by means of a post $c^4$, and an arm $d'$ on said lever, pivotally secured to said fork $a'$ by means of an arm $d$, provided with a bifurcated end which engages with the lower part of said oscillating frame to throw one of said gears thereon out of engagement with the mutilated gear on the index-hand shaft, substantially as and for the purpose set forth.

12. In a railway time-signal, the combination, with a clock mechanism and its index-hand, together with its shaft and a mutilated gear, of an oscillating gear-carrying frame, a spring attached thereto and to the clock-frame, a crank-lever provided with a forked end, an adjustable rod $a$, having springs $a^5$ and $a^6$ thereon, a yoke or saddle attached to said rod, and set-nuts arranged therein and on said rod for adjusting the tension of the spring $a^6$, and thereby limiting the upward and downward movement of the said rod, and a rail extending under and connected with the rails in the road-bed, for the purposes set forth.

13. In a railway time-signal, the combination, with a clock mechanism and its index-hand, together with its shaft and mutilated gear thereon, of an oscillating gear-carrying frame, a spring attached thereto and to the clock-frame, a crank-lever provided with a forked end, an adjustable rod, springs $a^5$ and $a^6$ thereon, a yoke or saddle attached to said rod, and set-nuts in said saddle and on said rod for adjusting the tension of the spring $a^6$, and thereby limiting the upward and downward movement of said rod, and a T-rail extending under the track and arranged within a hollow cross-tie, a fulcrumal post for pivotally supporting said T-rail at the one end thereof, and fastening devices on said rail for securing the same to the under side of the rails in the road-bed, as and for the purposes set forth.

14. In a railway time-signal, in combination, the T-rail having fastening devices $g$ thereon in pairs, said devices being adapted to extend up and embrace the flange of the railway-rail and secured thereto, said parts being arranged in a hollow tie, and a time-signaling apparatus on said tie, as and for the purposes set forth.

15. In an automatic railway time-signal, the combination of a hollow post A, a clock arranged on said post, a reciprocating rod $a$ in said post, journaled in a bracket on the back plate or clock-frame, a forked crank-lever pivotally secured to said rod $a$ and the clock-frame, an oscillating gear-carrying frame, the gearing of which is operated by the clock mechanism, said forked crank-lever engaging with said oscillating frame and imparting an oscillatory motion thereto during the up-and-down motion of the rod $a$, a gear $c^2$ on said oscillating frame, a mutilated gear meshing therewith, an index-hand shaft operated by said mutilated gear and the gear $c^2$, a spring on said shaft and a weight on the index-hand arranged to cause the return of the index-hand shaft to its normal position when the mutilated gear and the gear $c^2$ engaging with the same have been thrown out of mesh, and a rod or rail arranged in a hollow cross-tie and engaging with the rod $a$ in the lower part of the post A and operating by the intermediately-arranged mechanism to throw the gear $c^2$ and the mutilated gear out of their operative engagement, substantially as and for the purposes set forth.

16. In a railway time-signal, in combination, a hollow cross-tie provided with a fulcrumal post having arms $h'$, provided with knife-edges, as set forth, a T-rail within said hollow tie and pivotally hung on said knife-edges of the arms $h'$, devices $g$ on said T-rail for attaching the same to the railway-rails, and recesses $e^4$ in the top of the hollow tie directly below the rails to allow the deflection of the same during the passage of a train.

17. In a railway time-signal, the combination of fastening devices $g$, arranged on both sides of the railway-rails and secured thereto with the T-rail $e$, to which said devices are secured, a hollow tie in which said T-rail is arranged, a post $h$ therein, a clock-operating mechanism, and a connecting and releasing rod and levers between the T-rail $e$ and the clock mechanism, substantially as and for the purposes set forth.

18. In a railway time-signal, in combination, a hollow tie and a time-signaling apparatus arranged on said tie, said hollow tie being loosely arranged in the road-bed and secured to the adjacent ties E' and $E^2$ by means of strap $j$, as and for the purposes set forth.

19. In a railway time-signal, the rails $f$ and $f'$, the hollow tie E, secured to its adjacent ties E' and $E^2$ by means of straps $j$, a T-rail in said hollow tie secured to said rails $f$ and $f'$, the yoke $a^2$, rod $a$, spring $a^5$, and the nuts $a^3$ and $a^4$, in combination with an index-hand-operating mechanism and a pivoted rail arranged in said hollow tie, having a spring $e^5$ therein, as set forth.

20. The T-rail, the yoke $a^2$, the rod $a$, the spring $a^5$, and the nuts $a^3$ and $a^4$, in combination with an index-hand-operating mechanism, and a pivoted rail arranged in a hollow tie having a spring $e^5$ therein, as set forth.

21. The herein-described connection for communicating motion to an oscillating frame, consisting of a rod $a$, screwed into a fork $a'$, a crank-lever pivotally secured to a plate C by means of a post $c^4$, said lever having an arm $d'$, pivotally secured to a fork $a'$ by means of a pin, and an arm $d$, provided with the arms or ends $d^2$, adapted to engage with said oscillating frame, for the purposes set forth.

22. In a railway time-signal, the herein-described connection for communicating motion to the oscillating frame, consisting of an adjustable rod $a$, provided at its lower end with a coiled tension-spring, set-nuts on said rod for varying the tension of said spring, and a lever connected with said end of the rod and the rails in the road-bed, the upper end of said rod $a$ being secured to a fork $a'$, a crank-lever pivotally secured to a plate C by means of a post $c^4$, and an arm $d'$ on said lever which is pivotally secured to the fork $a'$ by means of an arm $d$, provided with a bifurcated end which engages with said oscillating frame, as and for the purposes set forth.

23. The herein-described oscillating frame $c$, substantially as shown, having gears $c'$ and $c^2$ thereon, and a pivotal pin $c^8$, in combination with the clock mechanism and the frame thereof, a pin $c^7$ on said frame, and a spring $c^6$, secured to the clock-mechanism frame and the frame carrying the gears $c'$ and $c^2$, as and for the purposes set forth.

In testimony that we claim the invention set forth above we have hereunto set our hands.

FRANK W. COOLBAUGH.
  IRVIN G. HOOPER.

In presence of—
 FREDK. C. FRAENTZEL,
 FREDK. S. RICE.